UNITED STATES PATENT OFFICE.

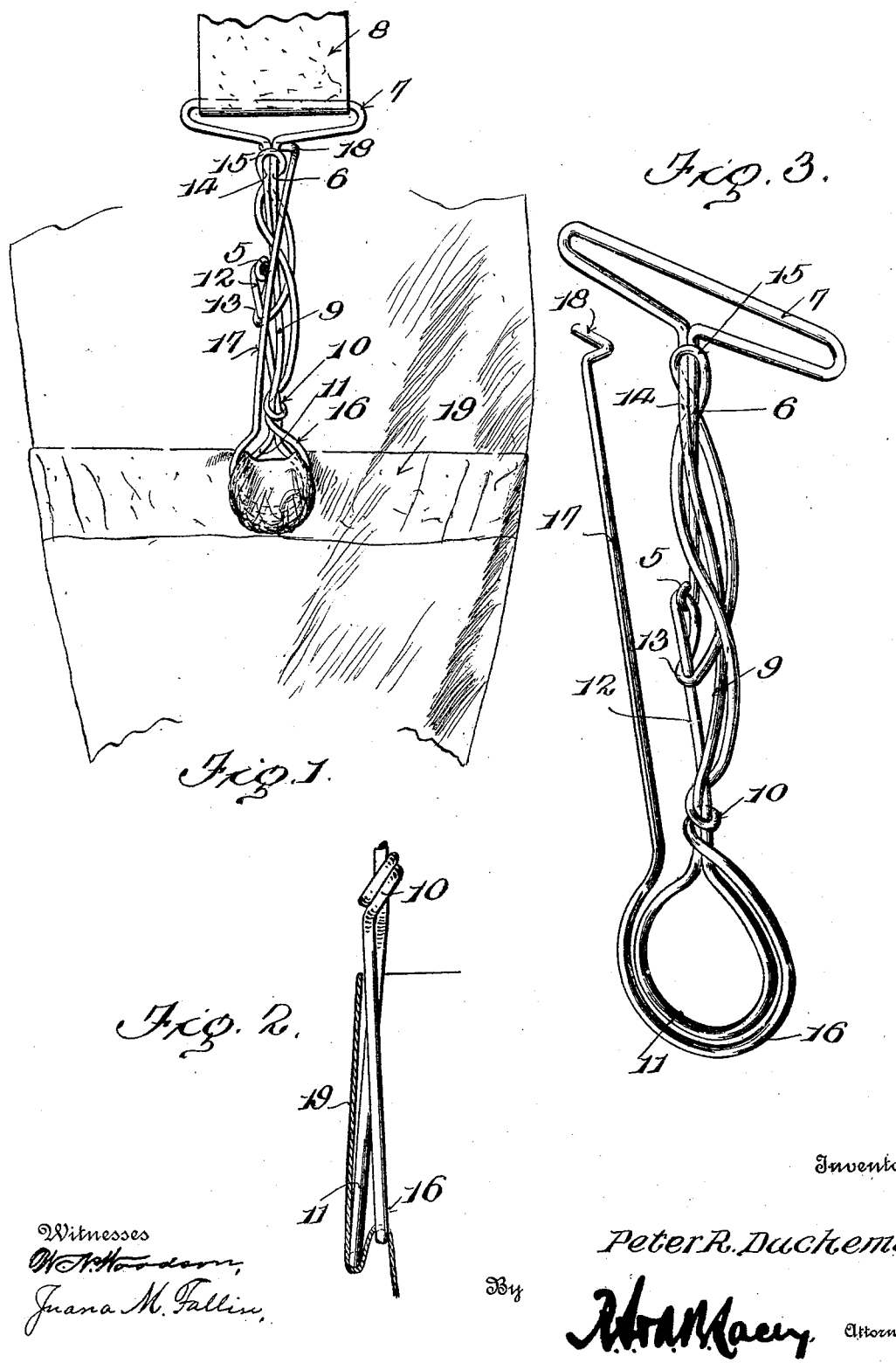

PETER R. DUCHEMIN, OF COLFAX, WASHINGTON.

HOSE-SUPPORTER.

961,112.  Specification of Letters Patent.  Patented June 14, 1910.

Application filed September 7, 1909. Serial No. 516,342.

*To all whom it may concern:*

Be it known that I, PETER R. DUCHEMIN, a citizen of the United States, residing at Colfax, in the county of Whitman and State of Washington, have invented certain new and useful Improvements in Hose - Supporters, of which the following is a specification.

This invention relates to hose supporters of that general class shown and described in my prior application filed in the United States Patent Office on the 16th day of June 1909, Serial No. 502,318.

The object of the invention is generally to improve and simplify the construction of the device and provide a supporter in which the suspension eye, gripping devices or loops and locking arm, are formed from a continuous length of wire, the strands of which are connected together in such a manner as to dispense with a retaining casing or housing.

A still further object of the invention is generally to improve this class of devices so as to increase their utility, durability and efficiency.

Further objects and advantages will appear in the following description, it being understood that various changes in form, proportions and minor details of construction may be resorted to within the scope of the appended claims.

For a full understanding of the invention and the merits thereof and also to acquire a knowledge of the details of construction and the means for effecting the result, reference is to be had to the following description and accompanying drawings, in which:

Figure 1 is a front elevation of a hose supporter constructed in accordance with my invention, showing the same attached to a suspension strap; Fig. 2 is a side elevation of the lower portion of the hose supporter, the hose being shown in section; Fig. 3 is an enlarged detail perspective view of the supporter detached.

Corresponding and like parts are referred to in the following description and indicated in all the views of the drawings by the same reference characters.

The improved hose supporter forming the subject matter of the present invention is preferably formed of a continuous length of spring wire or other suitable material, one end of which is bent to form a terminal hook 5 and thence extended longitudinally to produce a relatively short shank 6, the wire at the upper end of the shank 6 being extended laterally in opposite directions to form a transversely disposed loop or eye 7 for attachment to a suspension strap 8. The wire, after the eye 7 is formed is extended longitudinally in parallel relation to the shank 6 for a short distance and thence curved outwardly at 9 and continued downwardly through an eye 10 where it is bent to produce a relatively stationary gripping device or loop 11. The wire, after the loop 11 is formed is extended upwardly through the coil or eye 10 and over the hook 5 and thence downwardly and around the strand 12, as indicated at 13, being thence continued upwardly on a curved line and wrapped around the shank 6 and the adjacent shank 14, as indicated at 15. The wire, after being passed around the shanks 6 and 14, is carried downwardly in a spiral path to a point adjacent the stationary loop where it is coiled around the strands 9 and 12 to produce the convolution or eye 10, the wire being thence bent to produce a relatively movable clamping device or loop 16 which co-acts with the stationary loop 11 to grip the hose or other garment to be supported.

The wire forming the movable loop 16 is extended longitudinally to produce a spring locking arm 17, preferably extending to a point adjacent the suspension loop or eye 7, the free end of the wire forming the locking arm 17 being bent laterally to form an angularly disposed lip or lug 18 adapted to engage the shanks 6 and 14 immediately below the suspension loop 7 for the purpose of locking the gripping devices or loops in engagement with the garment.

It will here be noted that one end of the wire constituting the body of the hose supporter, is anchored on the strand 12 by means of the hook 5, while the intermediate portion of the wire is coiled around the shanks 6 and 14 and also around the strands 9 and 12 so that the several strands of wire are securely retained in assembled position, while at the same time the spring clamping arm 17 is free to be moved laterally in engagement with the shanks 6 and 14 to effect the locking of the loops 11 and 16 in engagement with a sock or other garment. Thus it will be seen that the strands of wire constituting the hose supporter are effectually retained in assembled position without the employment of the usual inclosing casing or housing, thereby materially reducing the cost of manufacture and producing a structure practically devoid of projections or sharp edges which would have a tendency to tear the garment and cut or otherwise lacerate the skin of the wearer.

In using the device, the upper edge of the hose or other garment 19 is introduced between the loops 11 and 16, after which the operator grasps the arm 17 and moves the upper end of the loop 16 over the top of the loop 11 and at the rear of the latter, the terminal lip or lug 18 of the locking arm being subsequently moved into engagement with the shanks 6 and 14 at the rear of the device so as to effectually clamp the hose between the gripping devices or loops of said supporter.

It is obvious that the supporter may be used for supporting either men's or women's hose, or wherever a device of this character is found practicable without departing from the spirit of the invention.

Having thus described the invention, what is claimed as new is:

1. A hose supporter formed of a single length of wire having a portion thereof bent to produce a suspension loop, and another portion thereof bent to form relatively stationary and movable gripping loops, one of which terminates in a longitudinally disposed locking arm, the intermediate portion of the wire being bent to form a plurality of longitudinal strands.

2. A garment supporter formed of a single length of wire having a portion thereof bent to produce a suspension loop, and another portion thereof bent to form relatively stationary and movable gripping loops, one of which terminates in a longitudinally disposed locking arm, that portion of the wire between the suspension loops and gripping loops being twisted to form a plurality of longitudinal strands, one end of the wire being bent to produce a terminal hook for engagement with one of said strands.

3. A garment supporter formed of a single length of wire, one end of which is bent to form a hook and thence extended longitudinally and bent laterally in opposite directions to produce a transversely disposed suspension loop, the wire being thence extended longitudinally to form a relatively stationary gripping loop, the wire after the loop is formed being extended upwardly in engagement with the hook and thence twisted around the adjacent strands of wire and extended downwardly and bent around the adjacent strands to produce a coil, the wire after the coil is formed being bent to produce a relatively movable clamping loop terminating in a longitudinally disposed locking arm.

4. A garment supporter formed of a single length of wire, one end of which is bent to form a hook, the wire being thence bent upwardly to produce a shank and extended laterally in opposite directions to form a transversely disposed suspension loop, the wire after the suspension loop is formed being extended downwardly in engagement with the first mentioned shank to form a second shank and thence continued downwardly and bent to produce a relatively stationary gripping loop, the wire after the gripping loop is formed being extended upwardly over the hook and thence around the adjacent strand of wire and upwardly and around said shanks, the wire being thence extended downwardly and coiled around the strands of wire forming the stationary loop, being thence bent to produce a relatively movable spring loop terminating in a longitudinally disposed locking arm, the free end of the wire forming the locking arm being bent laterally to form a locking lip adapted to embrace said shanks.

5. A hose supporter formed of a single length of wire, one end of which is provided with a terminal hook, the wire being thence extended upwardly to form a longitudinally disposed shank, and thence extended laterally in opposite directions to form a suspension loop, the wire after the loop is formed being extended downwardly in engagement with the first mentioned shank to form a second shank and thence continued downwardly and bent to produce a relatively stationary gripping loop, the wire after the gripping loop is formed being extended upwardly and over the hook and thence passed around the adjacent strand of wire and continued upwardly and passed around said shanks to form a binding loop, the wire being thence extended downwardly in a spiral path and bent to form a coil or convolution embracing the strands constituting the stationary gripping loop, the wire after the coil is formed being bent to produce a relatively movable gripping loop terminating in a longitudinally disposed locking arm, the wire forming the free end of the locking arm being bent upon itself to produce a horizontally disposed locking lip adapted to embrace both shanks for locking the gripping loops in engagement with a garment.

In testimony whereof I affix my signature in presence of two witnesses.

PETER R. DUCHEMIN. [L. S.]

Witnesses:
 G. W. LARUE,
 W. A. WHITE.